United States Patent [19]
Abrams

[11] Patent Number: 5,439,320
[45] Date of Patent: Aug. 8, 1995

[54] PIPE SPLITTING AND SPREADING SYSTEM

[76] Inventor: Sam Abrams, P.O. Box 3626, Fort Myers, Fla. 33918

[21] Appl. No.: 189,687

[22] Filed: Feb. 1, 1994

[51] Int. Cl.⁶ ............................................. F16L 1/028
[52] U.S. Cl. .................................... 405/154; 405/184
[58] Field of Search ....................... 405/154, 156, 184; 138/97; 166/55.2

[56] References Cited

U.S. PATENT DOCUMENTS

| | | | |
|---|---|---|---|
| 1,001,205 | 8/1911 | Lovell | 166/55.2 |
| 2,983,042 | 5/1961 | Frantz et al. | 30/91 |
| 3,181,302 | 5/1965 | Lindsay | 61/72.7 |
| 4,106,561 | 8/1978 | Jerome et al. | 166/55.2 |
| 4,455,107 | 6/1984 | Schosek | 405/184 |
| 4,903,406 | 2/1990 | Schosek et al. | 30/92.5 |
| 5,171,106 | 12/1992 | Rockower et al. | 405/156 |

*Primary Examiner*—David H. Corbin
*Attorney, Agent, or Firm*—Merrill N. Johnson

[57] ABSTRACT

The invention discloses a system for splitting and spreading existing underground pipe and pipe fittings. A plurality of cutter wheels are positioned within a cutter assembly frame. A first cutter wheel cuts the pipe and scores the pipe fittings. A second cutter wheel rides in the path cut in the pipe by the first cutter wheel and cuts the pipe fittings. A plurality of paired pipe expanders are formed on the outer periphery of the cutter assembly frame. Pipe expanders contact the inner surface of the pipe wall and keep the cross section of the pipe circular while the cutter wheels cut through the pipe and pipe fittings. Also, the paired pipe expanders keep the cutter wheels in a vertical alignment and thirdly, they loosen and scrape residue and built-up material from the inner wall of the pipe. A mandrel is connected to the trailing end of the cutter assembly and to a pipe adapter which in turn is connected to a foremost section of new pipe. The mandrel spreads the cut pipe and fittings and pulls the pipe adapter and the new pipe through the bore of the existing pipe. A train comprised of multiple sections of steel rods is connected to a leading end of the cutter assembly and pulls the cutter assembly and mandrel and pipe adapter and the new pipe through the bore of the existing pipe and pipe fittings. Cable/winching means or hydraulic means supply the motive power to use and operate the system.

25 Claims, 2 Drawing Sheets

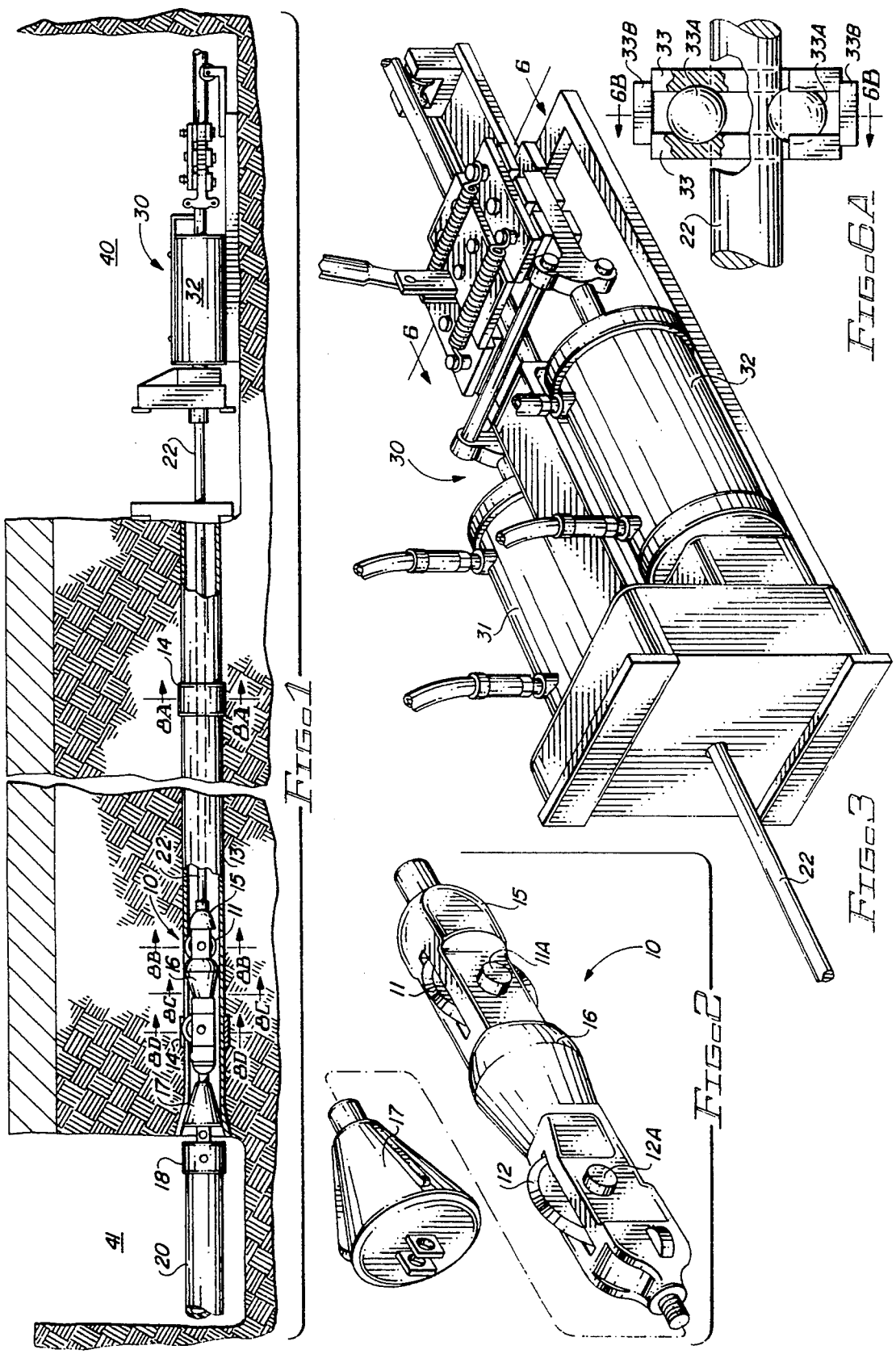

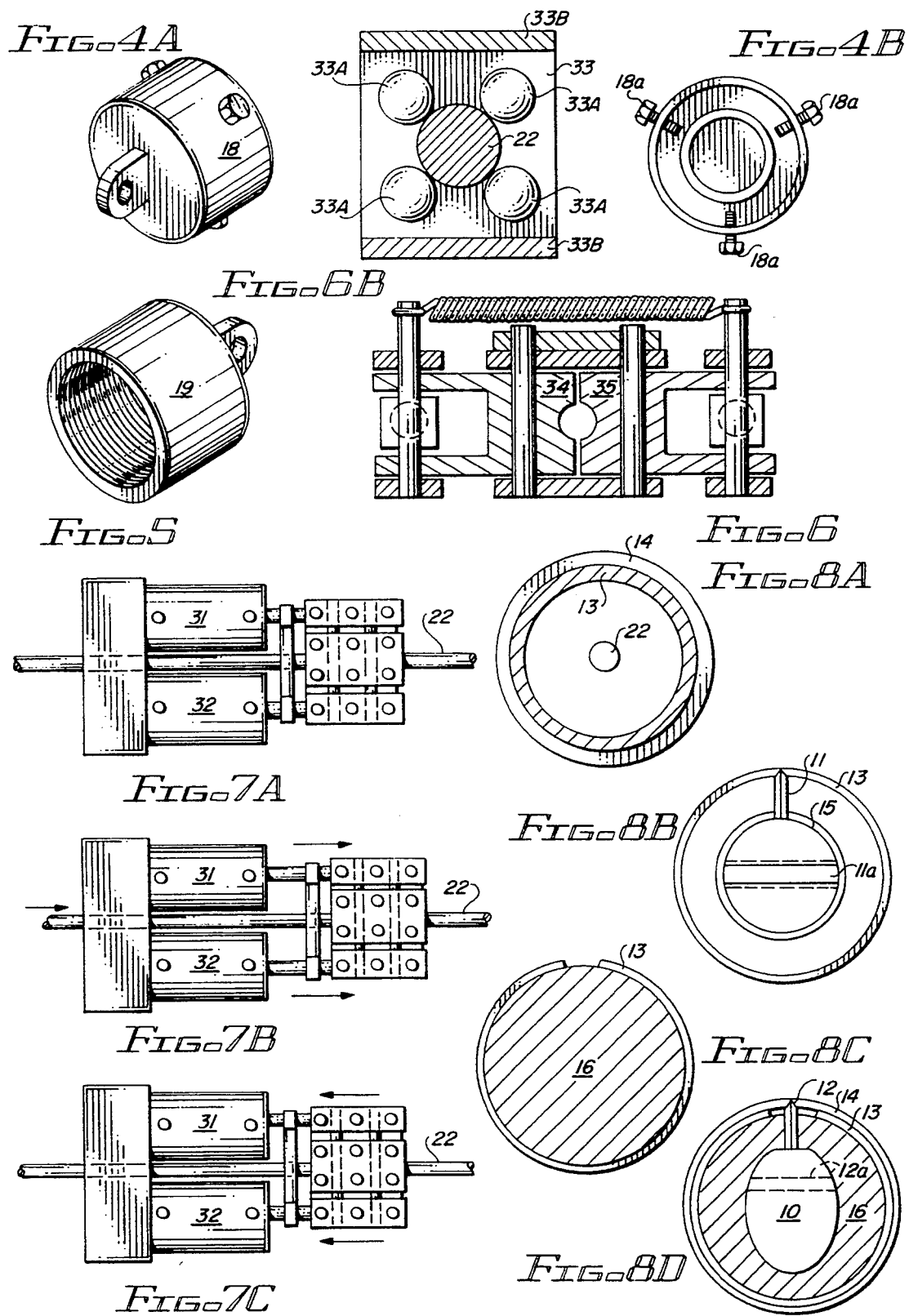

PIPE SPLITTING AND SPREADING SYSTEM

BACKGROUND OF THE INVENTION

1. Field of the Invention

The present invention relates to a system for splitting and spreading existing underground utility pipe and pipe fittings and pulling new pipe through the bore of the utility pipe and pipe fittings.

2. Description of the Background Art

Throughout the United States steps are being taken to improve methods of replacing existing underground utility pipe and pipe fittings. In many municipalities, the utility pipes have been installed long ago and must be replaced on a regular scheduled basis to maintain vital utility services to its customers. Also, where rapid growth has occurred, the utility pipes are now undersized with respect to the desired capacity and must be replaced with larger capacity pipe. Initial replacement methods involved excavating the entire length of pipe and replacing it with new pipe in the excavated trench. This was very expensive and time consuming. Further, other vital utility services (telephone, electric) were also disrupted because the conduits carrying those services were usually in the same trench.

Trenchless replacement of utility pipe initially focused on slipping smaller diameter pipe through the bore of the utility pipe. This reduced the installation time and expense dramatically. However, the smaller diameter slipped pipe also reduced the utility system capacity. This is unacceptable to most municipalities.

U.S. Pat. No. 2,983,042 issued to Frantz et al. discloses a tube splitting apparatus having a plurality of cutter wheels for cutting a tube (pipe) that is stuck in a sleeve into two halves. The cutter wheels shape the edge of the split halves inwardly. U.S. Pat. No. '042 teaches away from only one path for the cutter wheels to traverse. Further, U.S. Pat. No. '042 is silent on scoring and cutting the utility pipe fittings.

U.S. Pat. No. 1,001,205 issued to Lovell discloses a well casing splitter and perforator for admitting water or oil through a group of slits into the casing. U.S. Pat. No. '205 teaches away from making a continuous cut through the pipe. U.S. Pat. No. '205 is silent on scoring and cutting the utility pipe fittings.

U.S. Pat. No. 4,106,561 issued to Jerome et al. discloses a well casing perforator adapted for use with pneumatically powered rotary drilling equipment commonly found in the oil exploration field. U.S. Pat. No. '561 teaches the intermittent engagement of a cam shaped perforating wheel with the well casing. U.S. Pat. No. '561 teaches away from a plurality of circular cutting wheels in continuous engagement with the interior of the utility pipe wall. Further, U.S. Pat. No. '561 teaches away from hydraulic means to pull the cutter assembly through the bore of the underground utility pipe and pipe fittings.

U.S. Pat. No. 3,181,302 issued to Lindsay discloses a pipe splitter and spreader that cuts the existing pipe into two halves and spreads the halves apart. U.S. Pat. No. '302 teaches away from a plurality of cutter wheels making only one cut in the existing pipe and maintaining the cut pipe as one whole pipe, even after the cut is made. U.S. Pat. No. '302 teaches away from equal diameter cutter wheels. U.S. Pat. No. 5,171,106 issued to Rockower et al. discloses a cutting tool having a plurality of cutter wheels of unequal diameter. U.S. Pat. No. '106 also discloses a pair of guide rollers for rotational engagement with the interior wall of the pipe. U.S. Pat. No. '106 teaches away from equal diameter cutter wheels and further teaches away from a plurality of paired pipe expanders to loosen and scrape built-up debris from the interior wall of the existing pipe and pipe fittings.

U.S. Pat. No. 4,455,107 issued to Schosek discloses a hydraulic apparatus for forcing a rod through undisturbed earth with axial force exerted through a set of jaws. U.S. Pat. No. '107 teaches the installation of new plastic pipe only in the bore created by the rod traversing the undisturbed soil. U.S. Pat. No. '107 teaches away from a plurality of rods forming a train. U.S. Pat. No. '107 is silent on replacing existing utility pipe and pipe fittings.

U.S. Pat. No. 4,903,406 issued to Schosek et al. teaches the use of a pipe splitter apparatus having a single cutting wheel having a circular diameter greater than the bore of the pipe to be split. U.S. Pat. No. '406 teaches the use of side wheels to rotatably engage the interior wall of the pipe. U.S. Pat. No. '406 teaches away from a plurality of cutter wheels.

None of these previous efforts, however, provide the benefits intended with the present invention. Additionally, prior techniques do not suggest, the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, assemble, test and by employing only readily available material.

Therefore, it is an object of the present invention to provide a trenchless system to replace existing worn out utility pipe and pipe fittings with new pipe of equal or greater diameter.

It is a further object to provide a system to cut the pipe and the pipe fittings along a continuous longitudinal line on an upper hemispheric section of the pipe and pipe fittings.

It is another object of the invention to provide a pipe cutting system that maintains its vertical orientation through the entire traverse of the existing pipe to be replaced.

It is yet another object of the invention to provide a system that has equal diameter cutter wheels to minimize the inventory of cutter wheels in the field.

It is still another object of the invention to provide a system that loosens and scrapes built up debris from the interior wall of the existing pipe and pipe fittings as the cut is made.

It is yet another object of the invention to provide a hydraulic apparatus that can force a rod through undisturbed earth using only axial forces through a set of split jaws.

It is yet another object of the invention to provide a system that requires only two men to operate in the field.

It is still yet another object of the invention to provide a pipe spreading and splitting system that does not separate the existing pipe into two equal sized sections.

It is another object of the invention to provide a pipe splitting and spreading system that works equally well with either plastic or steel walled pipe.

It is yet another object of the invention to provide a pipe splitting and spreading system which operates with a minimum of force necessary to propel the invention through the existing pipe and pipe fittings and to ensure that the existing pipe and pipe fittings remain in place during the splitting/spreading process.

It is another object of the invention to provide a pipe splitting and spreading system which forms a single longitudinal cut along a longitudinal path of the pipe and pipe fittings to be split.

A final object of this invention to be specifically enumerated herein is to provide a pipe splitting and spreading system in accordance with the proceeding objects and which will conform to conventional forms of manufacture, be of simple construction and easy to use so as to provide a device that would be economically feasible, long lasting and relatively trouble free in operation.

Although there have been many inventions related to pipe splitting and spreading systems, none of the inventions have become sufficiently compact, low cost and reliable enough to become commonly used. The present invention meets the requirements of the simplified design, compact size, low initial cost, low operating cost, ease of installation and maintainability, and minimal amount of training to successfully employ the invention.

The foregoing has outlined the more pertinent objects of the invention. These objects should be construed to be merely illustrative of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a pipe splitting and spreading system for replacing underground utility pipe and pipe fittings with new pipe. The system comprises a cutter assembly having a plurality of co-aligned cutter wheels and a plurality of pipe expanders, a mandrel having a first section sized for expanding the cut existing pipe and a second section adapted for engaging a pipe adapter, and means (either a cable and winch, or a hydraulic apparatus) for towing the cutter assembly and the mandrel and the pipe adapter and the new pipe through the bore of the existing utility pipe and pipe fittings.

An alternative embodiment of the invention uses the hydraulic apparatus and a plurality of steel rods coupled together in a train to form a tunnel through new, undisturbed soil, and roads or driveways or the like. A coupling attaches the new pipe to the foremost steel rod in the train. Then, the hydraulic apparatus is reversed and the new pipe is pulled through the newly created tunnel.

The hydraulic means is mounted in a first trench pit. A plurality of steel rods are coupled together to form a train. Each steel rod is dispatched into the bore of the existing utility pipe and pipe fittings by a plurality of split jaws exerting an axial force on the steel rod.

A second trench pit is oriented to receive the foremost steel rod after it traverses the bore of the existing utility pipe and pipe fittings. The cutter assembly, the mandrel, the pipe adapter and the new pipe are coupled one to the other in serial communication. The leading end of the cutter assembly is coupled to the foremost steel rod in the train and then the hydraulic apparatus is reversed. The train tows the cutter assembly and mandrel and pipe adapter and new pipe through the bore of the existing utility pipe and pipe fittings. As each steel rod returns to the first trench pit, it is uncoupled from the train until finally, the cutter assembly and mandrel and pipe adapter, arrive at the first trench pit. Thereupon, the cutter assembly and mandrel and pipe adapter are uncoupled from the new pipe.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective drawing showing the general layout and operation of the invention in the field.

FIG. 2 is a perspective drawing of the cutter assembly.

FIG. 3 is a perspective drawing of the hydraulic apparatus.

FIG. 4A is a perspective drawing of the pipe adapter for plastic wall pipe.

FIG. 4B is a right hand side elevational view of the plastic pipe adapter.

FIG. 5 is a perspective drawing of the pipe adapter for steel wall pipe.

FIG. 6 is a front elevational view of the hydraulic apparatus showing the split jaws.

FIG. 6A is a front elevational view of the planetary balls gripping a steel rod.

FIG. 6B is a cross-sectional view of the planetary balls gripping a steel rod.

FIGS. 7A–7C are top plan views of the hydraulic apparatus showing its three functions of releasing/retracting, pushing and pulling the train.

FIG. 8A is a cross-sectional elevational view of the pipe and pipe joint taken along line 8A—8A of FIG. 1.

FIG. 8B is a cross-sectional elevational view of the cutter cutting the pipe taken along line 8B—8B of FIG. 1.

FIG. 8C is a cross-sectional elevational view of the cutter assembly passing through the cut pipe along line 8C–8C of FIG. 1.

FIG. 8D is a cross-sectional elevational view of the cutter cutting the pipe fitting taken along line 8D—8D of FIG. 1.

Similar reference characters refer to similar parts throughout the several views of the drawings.

DETAILED DESCRIPTION OF THE PREFERRED EMBODIMENT

Referring to FIG. 1, the invention generally comprises a cutter assembly 10 having an elongated frame and a leading end and a trailing end. A plurality of cutter wheels 11 and 12 are mounted longitudinally in the cutter assembly with journals 11A and 12A, respectively. Each cutter wheel 11, 12 is mounted on a transverse axle in the journal 11A, 12A to provide unencumbered rotational movement of each cutter wheel, as best seen in FIG. 2. The cutter wheels 11, 12 are co-aligned along the longitudinal axis of the cutter assembly 10. The first cutter wheel 11 cuts through the existing utility pipe 13 and scribes a scoring line on the existing utility pipe fittings 14. The second cutter wheel 12 cuttably engages the existing utility pipe fittings 14 within the scoring line and cuts the existing utility pipe fittings 14 along the scoring line. The second cutter wheel 12 does not cut through the utility pipe 13, but only cuts through the utility pipe fitting 14. The cutter assembly 10 also includes a plurality of pipe expanders 15 and 16 that fractionally and frictionally contact the interior wall of the utility pipe. The distance between the extremities of at least one of the pipe expanders 16 is greater than an inside diameter of the existing pipe, as best seen in FIG. 8C. The distance between the extremities of the second pipe expander 15 is approximately equal to the inside diameter of the existing pipe.

As best seen in FIG. 1, a mandrel 17 has a first end adapted for coupling to the trailing end of the cutter assembly 10. Further, the second end of the mandrel is adapted for coupling to a pipe adapter 18. The pipe adapter 18 is adapted to receive a foremost section of the new replacement pipe 20. The mandrel 17 is sufficiently sized to spread the existing underground pipe and pipe fittings as it traverses through the bore of the existing underground utility pipe and pipe fittings.

Pulling means 30 are provided to engage the cutter assembly 10 at its leading end and pull the elongated cutter assembly 10 and mandrel 17 and pipe adapter 18 and new pipe 20 through the bore of the existing utility pipe and pipe fittings.

The pipe expanders 15 and 16 frictionally contact the interior wall of the existing underground utility pipe. In this manner, the pipe expanders maintain the plurality of cutter wheels 11 and 12 in a vertical orientation and are sufficiently sized to maintain the frictional contact with an interior surface of the pipe wall during the entire traverse of the existing underground utility pipe and pipe fittings. Each of pipe expanders 15, 16 is oriented on an outer periphery of the elongated frame of the cutter assembly 10 forward of each one of the cutting wheels, as best seen in FIG. 2. For example, pipe expander 15 is oriented forward of the first cutter wheel 11 and protects the journal 11A of the first cutter wheel 11.

Further, pipe expander 15 is designed to be horizontally disposed and frictionally contact and continuously engage the interior surface of the pipe wall along a horizontal path for urging the first cutter wheel 11 to maintain a vertical orientation throughout the entire traverse of the existing underground utility. The first and second pipe expanders 15 and 16 are designed and sufficiently sized to loosen built-up scale and debris on the interior surface of the pipe wall 13 as they frictionally contact the interior of the pipe wall throughout the entire traverse of the existing underground utility pipe and pipe fittings. The second pipe expander 16 is oriented forward of the second cutter wheel 12 and protects its journal 12A of the second cutter wheel. As best seen in FIG. 2, plurality of steel rods which form a train 22. Each steel rod pipe expanders 16 is vertically disposed for frictionally contacting and continuously engaging the interior surface of the pipe wall along a swath wider than the inside diameter of pipe 13 for urging the second cutter wheel to maintain a vertical orientation in the scoring line described by the first set of paired pipe expanders 15 throughout the entire traverse of the existing underground utility pipe and pipe fittings. Further, the second set of paired pipe expanders 16 are designed and sufficiently sized to scrape the loosened built-up scale and debris from the interior surface of the wall of the pipe along the entire traverse of the existing underground utility pipe and pipe fittings. Still further, the second set of pipe expanders 16 spreads the wall of the existing underground utility pipe and pipe fittings.

The first cutter wheel 11 is mounted in an upper portion of the elongated frame in proximity to the leading end of the cutter assembly 10 and the second cutter wheel is also mounted in an upper portion of the elongated frame in proximity to the trailing end of the cutter assembly, as best seen in FIG. 2. This arrangement facilitates the cutting of the pipe 13 and pipe fittings 14 cleanly and efficiently.

As an alternative embodiment, a third cutter wheel is mounted longitudinally in the elongated frame of the cutter assembly. The third cutter wheel engages a bottom section of the interior wall of the pipe and cuts through any built up scale and debris and perforates the pipe. The third cutter wheel is disposed within the elongated frame of the cutter assembly to urge the third cutter wheel to pass freely through the pipe fittings without cuttably engaging the pipe fittings. The third cutter wheel is positioned rearwardly of the second cutter wheel and journaled for rotational movement around a transverse axis within the elongated frame of the cutter assembly. The third cutter wheel facilitates cutting and perforating the lower section of the pipe, but passes freely through the pipe fittings.

An important feature of the invention is the fact that the cutter wheels all have the same diameter. That is, the diameter of the first cutter wheel is equal to the diameter of the second cutter wheel and is equal to the diameter of the third cutter wheel, if used. This significantly reduces the inventory of parts when the system is deployed for use and operation in the field.

As best seen in FIG. 2, the mandrel 17 has a front section having a frustro-conical outer periphery that spreads the existing underground utility pipe fittings as the mandrel 17 traverses through the existing underground utility pipe and pipe fittings. The mandrel 17 comes in an assortment of sizes, each mandrel being sized for spreading the existing utility underground pipe and fittings, according to the pipe diameter. Likewise, the cutter assembly 10 is available in an assortment of sizes accommodate various pipe diameters encountered in the field.

In the preferred embodiment of the invention, the means for pulling the cutter assembly and mandrel and new pipe through the bore of the existing underground utility pipe and pipe fittings is a plurality of steel rods which form a train 22. Each steel rod has a threadable end adapted for attachment to a rod coupling which in turn is coupled to a succeeding steel rod for forming the train to guide the cutter assembly and mandrel and new pipe through the bore of the existing underground utility pipe and pipe fittings. A foremost steel rod has a first end adapted for removable attachment to the leading end of the cutter assembly. Each steel rod is fabricated from a high strength steel, preferably alloy steel to reduce the chance of breakage when the train is traversing the bore of the existing underground utility pipe and pipe fittings. The high strength alloy steel is necessary to eliminate any chance of breakage when the train is pulling the cutter assembly 10 and mandrel 17 and new pipe 20 through the bore of the existing underground utility pipe and pipe fittings.

The mandrel 17 has a first end that is adapted for coupling to the trailing end of the cutter assembly 10 and a second end adapted to receive a pipe adapter 18, 19. The pipe adapter 18 is adapted to receive a foremost section of the new pipe. In one embodiment shown in FIGS. 4A and 4B, the pipe adapter has a plurality of threaded apertures radially oriented on an outer periphery, each aperture for receiving a threaded fastener 18a to threadably engage the pipe adapter 18 and the foremost section of new plastic pipe 20 in threadable communication. In another form the pipe adapter 19 has a recess that is threaded and properly sized to receive a threaded steel wall pipe as best seen in FIG. 5. The first section of mandrel 17 has a frustro-conical shape for expanding the bore of the existing underground utility pipe and pipe fittings in a progressive manner as the mandrel 17 traverses the bore. The pipe adapter 18, 19 is securely attached to the foremost section of new pipe 20 prior to pull the new pipe through the bore of the existing underground utility pipe and pipe fittings.

A less preferred embodiment of the pulling means has a cable and winch apparatus to engage the cutter assembly 10. The cable has a first end attached to the winch and a second end adapted for removable attachment to the leading end of the cutter assembly 10. The leading end of the cutter assembly is adapted to receive the first end of the winch cable by means of a rotatable screw eye or the like.

The preferred embodiment of the invention has a hydraulic apparatus 30 to engage the train and pull the cutter assembly and mandrel and new pipe through the bore of the existing utility pipe and pipe fittings, as best seen in FIG. 3. The hydraulic apparatus intermittently engages each steel rod of train 22 in axial communication and pull the train and cutter assembly 10 and mandrel 17 and new pipe 20 through the existing underground utility pipe 13 and pipe fittings 14. A plurality of rod guides 33, each having a plurality of spherical balls 33A arranged in a planetary relationship urge the rods to remain in axial alignment with the hydraulic apparatus. Cross-bars 33B urge the rod guides 33 to maintain axial communication with the rod throughout the releasing/retracting, pushing, and pulling phases of the hydraulic apparatus 30 with the steel rods.

The hydraulic means are mounted in a first trench pit 40 oriented in general alignment and elevation with the existing underground utility pipe and pipe fittings section to be replaced. The hydraulic means dispatches each steel rod through the existing underground utility pipe and pipe fittings to a second trench pit 41 where the cutter assembly and mandrel and pipe adapter and new pipe are threadably engaged to the foremost steel rod.

The second trench pit 41 is oriented in general alignment and elevation with the existing underground utility pipe and pipe fittings to be replaced and is at a second end of the underground existing utility pipe and pipe fittings opposite the first trench pit 40. The system allows a crew of only two people to deploy the invention and operate the system. This provides a significant labor savings over other methods of replacing worn out underground pipe and pipe fittings. The first crew member is located in the first trench pit 40 and threadably couples each steel rod to form the train. The hydraulic means then dispatches each steel rod through the bore of the existing pipe and pipe fittings to the second trench pit 41. The second crew member is located in the second trench pit 41 and upon receipt of the foremost steel rod, threadably engages the leading end of the cutter assembly 10 to the foremost steel rod. Then the second crew member sequentially couples the mandrel 17 to the trailing end of the cutter assembly, the pipe adapter 18, 19 to the mandrel, and engages the foremost section of the new pipe 20 to the pipe adapter.

Upon the appropriate signal, the hydraulic means 30 in the first trench pit 40 is reversed and pulls the train and cutter assembly 10 and mandrel 17 and pipe adapter 18, 19 and new pipe 20 through the bore of the existing utility pipe and pipe fittings. The first trench pit 40 is sufficiently sized to allow docking of the cutter assembly 10 after a complete traverse of the existing pipe and pipe fittings. In this manner, the first crew member can uncouple in a sequential manner, each steel rod 22 from the train, the cutter assembly 10, the mandrel 17, and the pipe adapter 18, 19.

The hydraulic means intermittently engage each steel rod with a plurality of split jaws such as 34 and 35 as seen in FIG. 6. Each set of split jaws is horizontally disposed to engage each steel rod axially and pull each steel rod without twisting or turning the steel rod. If twisting or turning were to occur, the resultant forces would missalign the cutter assembly and mandrel and pipe adapter and new pipe within the bore of the existing utility pipe and pipe fittings and generate great resistance to traverse that the hydraulic means would not be able to overcome.

The hydraulic means include a pair of hydraulic cylinders 31 and 32. Each hydraulic cylinder can be co-aligned in a common horizontal plane or a common vertical plane for providing simultaneous engagement and disengagement of each set of split jaws with each steel rod. The preferred relationship is horizontal disposition of the split jaws as shown in FIG. 6. In the vertical plane arrangement, the jaws are vertically oriented in an upper/lower relationship.

It has been found in the field that the hydraulic means must generate a force of about between 60,000 to 100,000 pounds in order to successfully split and spread most existing underground utility pipe and pipe fittings and pull the new pipe through the existing underground utility pipe and pipe fittings, regardless of the soil condition or type.

Also, it has been found that each trench pit 40, 41 should be about between five to seven feet in length to accommodate the two man crew and allow them to set up and operate the system and dock the cutter assembly after a complete traverse of the existing utility pipe and pipe fittings.

As shown in FIGS. 2, 8B and 8D, the cutter wheels include a cutting edge and are of a sufficient diameter to cut completely through a pipe wall. However, pipe fittings have larger wall thicknesses than pipe. Accordingly, first cutter wheel 11 is oriented to scribe a scoring line on the pipe fittings. The second cutter wheel 12, although it is the same diameter as the first cutter wheel, is oriented within the cutter assembly to cuttably engage the scoring line in the pipe fittings and cut completely through the pipe fittings. The invention is unique in the fact that although it uses equal diameter cutting wheels, it achieves its intended purpose of having a first cutter wheel cut through the pipe body and the second cutter wheel cut through the pipe fittings by positioning each cutter wheel within a section of the cutter frame assembly so that the cutting edge is predispositioned to cuttably engage the wall of the pipe, or in the case of the second cutting wheel, the wall of the pipe fittings, respectively.

The first cutter wheel and the second cutter wheel cuttably engage the pipe and the pipe fittings respectively in an upper portion of the pipe and the pipe fittings. In this manner, the pipe retains its structural integrity below a cut path and precludes separating the pipe into two halves. If this condition were to occur, dirt, refuse, loose rock, and other material could interfere with the new pipe traversing through the bore of the existing utility pipe and pipe fittings.

In yet another embodiment of the invention, the hydraulic system can be used to create a tunnel through undisturbed soil and facilitate pulling the new utility pipe and pipe fittings through the tunnel. This approach eliminates the necessity to dig up and excavate the street to install the utility pipe, which eliminates the obstruction to vehicular traffic. Excavation is also time consuming and expensive.

The system creates the tunnel by pushing the plurality of steel rods that form the train through the undisturbed soil and forms a tunnel, under a road or the like. A rod push pipe cap is threadably coupled to an end of the foremost steel rod. The first trench pit houses the hydraulic means and dispatches the plurality of steel rods that form the train through the undisturbed soil to form the tunnel for the new underground utility pipe and pipe fittings to traverse.

A second trench pit receives the foremost steel rod and the rod push-pipe cap after the tunnel is formed. The rod push pipe cap is uncoupled and then a first section of the mandrel is threadably attached to an end of the foremost steel rod. The mandrel has a first section that is adapted for threadable coupling to a trailing end of the train. The mandrel further has a second section that is adapted for coupling to a pipe adapter which in turn is coupled to a foremost section of the new pipe. After the connections are established, and upon the appropriate signal, the hydraulic means is reversed in the first trench pit and the process is reversed. Thereupon, the train is pulled through the tunnel and consequently pulls the mandrel and the pipe adapter and the new pipe through the bore of the tunnel. Both the first trench pit and the second trench pit are in general alignment and elevation with the tunnel and with each other. The mandrel is properly sized to guide the pipe adapter, pipe and pipe fittings through a bore of the tunnel, according to the pipe diameter.

The present disclosure includes that contained in the appended claims, as well as that of the foregoing description. Although this invention has been described in its preferred forms with a certain degree of particularity, it is understood that the present disclosure of the preferred forms have been made only by way of example and that numerous changes in the details of structures and the combination and arrangement of parts may be resorted to without departing from the spirit and scope of the invention as set forth in the following claims.

What is claimed is:

1. A pipe splitting and spreading system for replacing existing underground utility pipe and pipe fittings with new pipe comprising in combination:
    a cutter assembly having an elongated frame and a leading end and a trailing end and a plurality of co-aligned cutter wheels mounted longitudinally in the cutter assembly, the first cutter wheel for cutting through the existing utility pipe and scrubbing a scoring line on the existing utility pipe fittings, the second cutter wheel for cuttably engaging the existing utility pipe fittings in the scoring line, and cutting the existing utility pipe fittings along the scoring line, the cutter assembly further including a plurality of pipe expanders adapted for frictionally expanding the interior wall of the existing underground pipe and pipe fittings wherein the distance between extremities of one of the paired pipe expanders is greater than an inside diameter of the existing pipe;
    a mandrel having a first section adapted for coupling to the trailing end of the cutter assembly and a second section adapted for coupling to a pipe adapter, the mandrel being of a sufficient size to expand the existing cut underground pipe and pipe fittings as it traverses through a bore of the existing underground utility pipe and pipe fittings; and
    means for engaging the cutter assembly and pulling the cutter assembly and the mandrel and the pipe adapter and the new pipe connected to the pipe adapter through the bore of the existing underground utility pipe and pipe fittings.

2. A pipe splitting and spreading system for replacing existing underground utility pipe and pipe fittings with new pipe comprising in combination:
    a cutter assembly having an elongated frame and a leading end and a trailing end and a plurality of co-aligned cutter wheels mounted longitudinally in the cutter assembly, the first cutter wheel for cutting through the existing utility pipe and scrubbing a scoring line on the existing utility pipe fittings, the second cutter wheel for cuttably engaging the existing utility pipe fittings in the scoring line, and cutting the existing utility pipe fittings along the scoring line, the cutter assembly further including a plurality of pipe expanders adapted for frictionally expanding the interior wall of the existing underground pipe and pipe fittings wherein the distance between extremities of one of the paired pipe expanders is greater than an inside diameter of the existing pipe;
    a pipe adapter having a front end adapted for coupling to the trailing end of the cutter assembly and a rear end adapted to carry a new pipe; and
    means for engaging the cutter assembly and pulling the cutter assembly and the pipe adapter and the new pipe through the bore of the existing utility pipe and pipe fittings.

3. A pipe splitting and spreading system as recited in claim 1 wherein the pipe expanders frictionally contact the interior wall of the existing underground utility pipe and pipe fittings for maintaining the cutter wheels in a vertical orientation, each of the pipe expanders being sufficiently sized for maintaining the frictional contact with the interior surface of the wall during the entire traverse of the existing underground utility pipe and fittings.

4. A pipe splitting and spreading system as recited in claim 1 wherein each pipe expander is oriented on an outer periphery of the cutter assembly forwardly of one of the cutting wheels.

5. A pipe splitting and spreading system as recited in claim 1 wherein a first pipe expander is oriented forward of the first cutter wheel for protecting a journal of the first cutter wheel and horizontally disposed for contacting the interior of the wall along a horizontal line for urging the first cutter wheel to remain in a vertical orientation, the first pipe expander further designed for loosening built up scale and debris throughout the entire traverse of the existing underground utility pipe and fittings.

6. A pipe splitting and spreading system as recited in claim 1 wherein a second pipe expander is oriented forward of the second cutter wheel for protecting a journal of the second cutter wheel and vertically disposed for contact in the interior of the wall along a wide swath for urging the second cutter wheel to remain in a vertical orientation in the score line, the second pipe expander further being for scraping and sweeping built up scale and debris from the interior wall of the entire traverse of the existing underground utility pipe and fittings, the second pipe expander still further for spreading the wall of the existing underground utility pipe and pipe fittings.

7. A pipe splitting and spreading system as recited in claim 1 wherein the first cutter wheel is mounted in a lower portion of the cutter assembly in proximity to the leading end and the second cutter wheel is mounted in an upper portion of the cutter assembly in proximity to the trailing end.

8. A pipe splitting and spreading system as recited in claim 1 wherein the first cutter wheel has a diameter equal to a diameter of the second cutter wheel.

9. A pipe splitting and spreading system as recited in claim 1 wherein the first section of the mandrel further includes a frustro-conical outer periphery sufficiently sized to spread the existing underground utility pipe and fittings as the mandrel traverses the existing underground utility pipe and fittings.

10. A pipe splitting and spreading system as recited in claim 1 wherein the means for engaging the cutter assembly further includes a plurality of steel rods and couplings having threaded ends adapted for coupling to each other for forming a train and further for guiding the cutter assembly through the existing utility pipe and pipe fittings.

11. A pipe splitting and spreading system as recited in claim 10 wherein a foremost steel rod has a first end adapted for removable attachment to a leading end of the cutter assembly, 12. A pipe splitting and spreading system as recited in claim 10 wherein the threaded rods and threaded couplings are fabricated from a high strength alloy steel for reducing breakage when traversing the existing underground utility pipe and fittings and pulling the cutter assembly and mandrel and pipe adapter and new pipe through the bore of the existing utility pipe and fittings, 13. A pipe splitting and spreading system as recited in claim 1 wherein the first section of the mandrel further includes a first end adapted for coupling to the trailing end of the cutter assembly and a second end adapted for receiving a first end of the pipe adapter in detachable communication, the pipe adapter having paired coaligned apertures, each aperture for receiving a threaded fastener for detachable communication between the second section of the mandrel and the pipe adapter.

14. A pipe splitting and spreading system as recited in claim 13 wherein the pipe adapter further includes a second end having an annular recess adapted for receiving a foremost section of the new pipe.

15. A pipe splitting and spreading system as recited in claim 14 wherein the annular recess is sufficiently sized and adapted to receive plastic wall new pipe.

16. A pipe splitting and spreading system as recited in claim 14 wherein the annular recess is sufficiently sized and adapted to receive steel wall new pipe.

17. A pipe splitting and spreading system for replacing existing underground utility pipe and pipe fittings with new pipe comprising in combination:

a cutter assembly having an elongated frame and a leading end and a trailing end and a plurality of co-aligned cutter wheels mounted longitudinally in the cutter assembly, the first cutter wheel for cutting through the existing utility pipe fittings, the second cutter wheel for cuttably engaging the existing utility pipe fittings in the scoring line and cutting the existing utility pipe along the scoring line, the cutter assembly further including a plurality of pipe expanders adapted for frictionally expanding the interior wall of the existing underground pipe and pipe fittings wherein the distance between extremities of at least one of the pipe expanders is greater than an inside diameter of the existing pipe;

a train of steel rods and couplings having threaded ends adapted for coupling to each other, the train guiding the cutter assembly through the existing utility pipe and pipe fittings;

a mandrel having a first section adapted for threadable coupling to the trailing end of the cutter assembly and a second section adapted for threadable coupling to a pipe adapter, the mandrel being of a sufficient size to spread the existing underground pipe and pipe fittings as it traverses through a bore of the existing underground utility pipe and pipe fittings;

hydraulic means for intermittently engaging each steel rod in axial communication and pulling the plurality of steel rods and the cutter assembly and the mandrel and the pipe adapter and the new pipe through the bore of the existing underground utility pipe and pipe fittings; and a plurality of rod guides for urging each steel rod to remain in axial alignment with the other steel rods in the train.

18. A pipe splitting and spreading system as recited in claim 17 and further including a first and a second trench pit for housing the hydraulic means and for attaching the cutter assembly to the foremost steel rod, each trench pit further includes an area sufficiently sized for docking the cutter assembly for urging the uncoupling of each steel rod in the train, and further for urging the uncoupling of the foremost steel rod and the cutter assembly from the mandrel and the pipe adapter and the new pipe after a complete traverse of the existing pipe and pipe fittings.

19. A pipe splitting and spreading system as recited in claim 17 wherein the hydraulic means further includes a plurality of split jaws, horizontally disposed for intermittently engaging each steel rod axially and pulling the steel rod without twisting or turning the steel rod.

20. A pipe splitting and spreading system as recited in claim 17 wherein the hydraulic means is reversible for pushing the steel rods from the first trench pit frame to the second trench pit frame prior to engaging the cutter assembly and the mandrel and the pipe adapter and the new pipe to the foremost section of the steel rod.

21. A pipe splitting and spreading system as recited in claim 19 wherein the hydraulic means further include a pair of hydraulic cylinders, co-aligned in a common horizontal plane for urging simultaneous engagement and disengagement of each set of split jaws with each steel rod when pulling the train and cutter assembly and mandrel and pipe adapter and new pipe through the existing underground utility pipe and fittings, the first cylinder being in hydraulic communication with the upper set of split jaws, and the second cylinder being in hydraulic communication with the lower set of split jaws.

22. A pipe splitting and spreading system as recited in claim 17 wherein each rod guide further includes a plurality of spherical balls oriented in a planetary relationship for maintaining the steel rod engaged in the set of split jaws in axial communication with the remaining steel rods in the train.

23. A pipe splitting and spreading system as recited in claim 17 wherein the hydraulic means develops a force of about between 60,000 to 100,000 pounds for splitting and spreading the existing underground utility pipe and fittings and pulling the new pipe through the bore of the existing underground utility pipe and fittings in a variety of soil conditions and types.

24. A pipe splitting and spreading system as recited in claim 17 wherein each trench pit frame is about between five to seven feet in length to accommodate a two-man crew to set up and operate the system.

25. A pipe splitting and spreading system as recited in claim 1 wherein the pipe adapter further includes a trailing end adapted for secure attachment to the foremost section of the new pipe for pulling the new pipe through the bore of the existing underground pipe and pipe fittings.

* * * * *